Sept. 29, 1931.  J. E. BOGER  1,825,572
CONVEYER
Filed Nov. 8, 1930
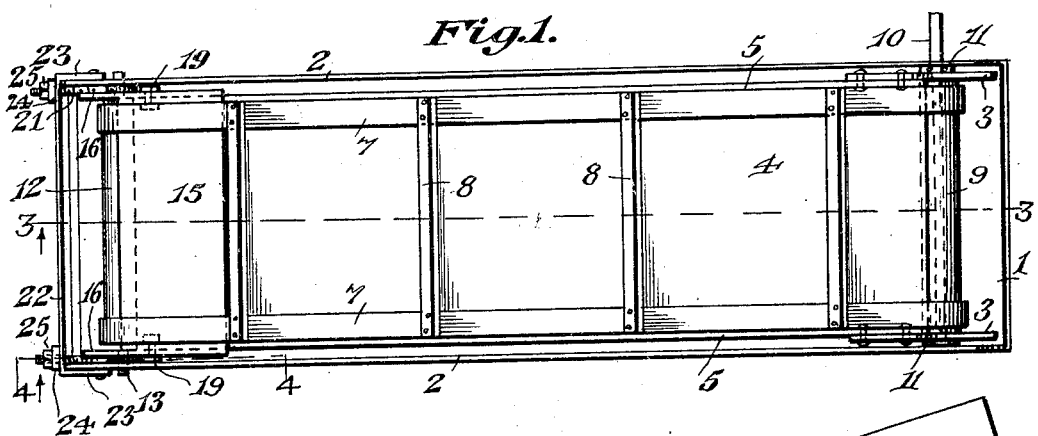
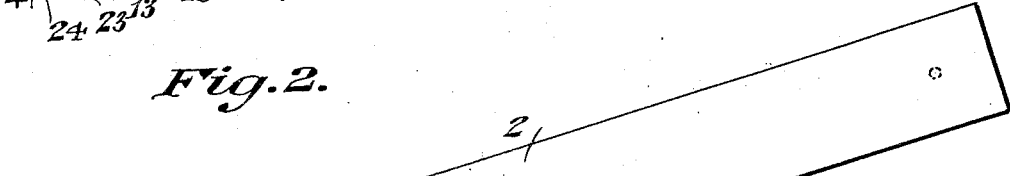
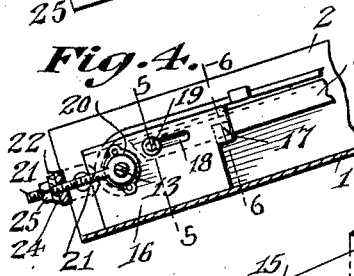
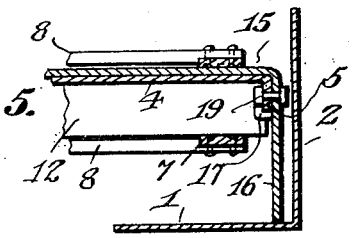
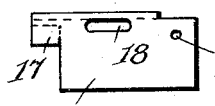
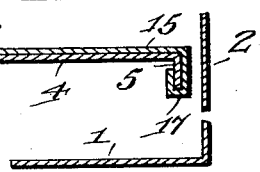
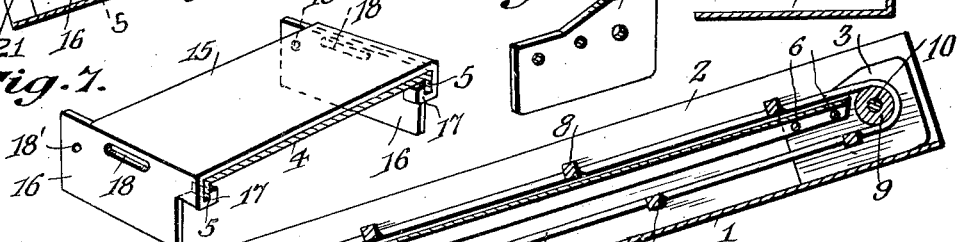
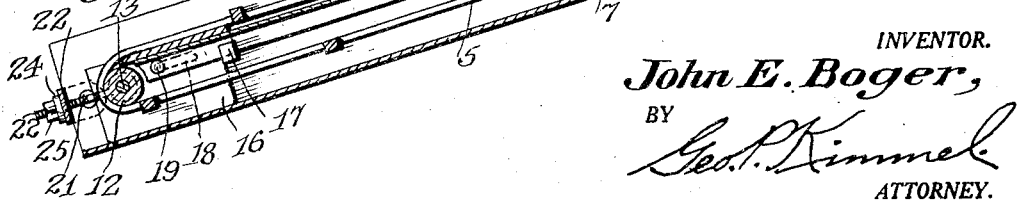
INVENTOR.
John E. Boger,
BY
Geo. P. Kimmel
ATTORNEY.

Patented Sept. 29, 1931

1,825,572

UNITED STATES PATENT OFFICE

JOHN E. BOGER, OF HOISINGTON, KANSAS

CONVEYER

Application filed November 8, 1930. Serial No. 494,395.

This invention relates to a conveyer particularly adapted for use either as the platform or elevator conveyer of a harvester, and has for its primary object to provide, in a manner as hereinafter set forth, a conveyer of such class which is less expensive and longer lived than the usual canvas conveyer used on harvesters, and which will be unaffected by moisture and therefore need not be removed at night.

A further object of the invention is to provide a conveyer of the character aforesaid which may be manufactured as an original part of a harvester, or which may be manufactured as a separate unit and readily installed with respect to a harvester of usual construction.

A further object of the invention is to provide a conveyer of the character aforesaid which is provided with means for preventing the winding of standing grain on the conveyer roller at the grain end of the harvester.

With the foregoing and other objects in view, the invention consists of the novel construction, combination and arrangement of parts as hereinafter more particularly described, and as illustrated in the accompanying drawings wherein is shown an embodiment of the invention, but it is to be understood that the description and drawings are to be taken as illustrative and that the invention is intended to be limited only by the scope of the claims hereunto appended.

In the accompanying drawings in which like numerals are employed to designate like parts throughout the several views:

Figure 1 is a top plan of a conveyer in accordance with this invention showing the same mounted on a harvester platform.

Figure 2 is a side elevation thereof.

Figure 3 is a section taken on the line 3—3 of Figure 1.

Figure 4 is a fragmentary section taken on the line 4—4 of Figure 1.

Figure 5 is a fragmentary section taken at a point indicated by the line 5—5 of Figure 4.

Figure 6 is a fragmentary section taken at a point indicated by the line 6—6 of Figure 4.

Figure 7 is a perspective view of the grain guard mounted on the conveyer base shown in section.

Figure 8 is an end elevation of the guard.

Figure 9 is a perspective of one of the liner elements to which the conveyer base is secured.

By way of example the conveyer is shown in connection with a harvester platform indicated at 1 and including upstanding side members 2. Disposed on the platform 1 are a pair of liner elements 3 to which a conveyer base 4 is secured, adjacent one end of the latter. The conveyer base 4 is of flat, metal construction formed at its sides with a pair of downturned flanges 5 which are connected to the liner elements 3 by means of suitable bolts 6.

Extending around the base 4, lengthwise thereof, are a plurality of endless belts 7, in the present instance two in number, although the number of belts may be increased if desired. Connecting the belts 7 are a plurality of slats 8 which extend transversely of the base 4. The belts 7 are counter-sunk into the lower faces of the slats 8 in order that the latter may have contacting relation with the upper face of the base 4 throughout the length of the slats.

The belts 7 preferably are formed of a rubber composition and extend around a roller 9 which is fixedly mounted on a power shaft 10 supported by the liner elements 3 and extending through one of the side members 2 of the platform. The shaft 10 is provided with suitable bearings 11. The roller 9 is disposed at one end of the base 4 in close proximity thereto. Adjacent the opposite end of the base 4, the belts 7 extend around a roller 12 mounted on a shaft 13, the ends of which project through elongated slots 14 formed in the side members 2 and extending lengthwise thereof.

Mounted on the base 4, adjacent the roller 12, is a grain guard 15 which extends transversely of the base and which is formed with downturned flanges 16 which overlap the flanges 5 on the base 4 and rest on the platform 1. A portion 17 of each flange 16 is bent around the lower edge of one of the flanges 5 whereby the guard 15 is securely though slidably mounted on the base 4. The flanges 16 are provided with horizontally extending slots 18 through which slidably extend bolts 19 secured to the flanges 5 and projecting laterally therefrom. The shaft 13 is provided with bearings 20 which are riveted or otherwise fixedly secured to the flanges 16, the shaft extending through openings 18' in the flanges 16.

Revolubly mounted with respect to the shaft 13 are a pair of adjusting bolts 21 which extend through a brace 22 extending transversely of the platform and provided at its ends with right angularly disposed portions 23 rigidly secured to the side members 2 of the platform. Exteriorly of the brace 22, the adjusting bolts 21 are provided with adjusting nuts 24 and lock nuts 25. By manipulation of the nuts 24 and 25, the roller 12 may be adjusted with respect to the roller 9 in order to maintain the proper tension on the belts 7. Owing to the rigid connection between the guard 15 and shaft 13, and to the slidable connection between the guard 15 and base 4, the guard 15 moves as a unit with the roller 12 when adjusting the latter.

It is thought that the many advantages of a conveyer in accordance with this invention will be readily apparent, and although the preferred embodiment of the invention is as illustrated and described, it is to be understood that changes in the size, shape and arrangement of parts may be resorted to, so long as such changes fall within the scope of the invention as defined in the appended claims.

What I claim is:—

1. In a conveyer for mounting on a harvester platform, a conveyer base, an endless conveyer element encircling the base, and a grain guard extending across the conveyer element, said grain guard being slidably connected with the base and having downwardly extending flanges in sliding contact with the platform.

2. In a conveyer for mountitng on a harvester platform, a conveyer base, an endless conveyer element encircling the base, a grain guard slidably mounted on the base and platform and extending across the conveyer element, a shaft movable with said grain guard, a roller carried by the shaft and supporting the conveyer element adjacent one end of the base, a brace secured to one end of the platform, and a pair of adjusting bolts rotatably connected with said shaft and extending through said brace.

In testimony whereof, I affix my signature hereto.

JOHN E. BOGER.